United States Patent

[11] 3,549,969

| | | |
|---|---|---|
| [72] | Inventor | Koichi Yoshimura<br>Kadoma-shi, Japan |
| [21] | Appl. No. | 730,288 |
| [22] | Filed | May 20, 1968 |
| [45] | Patented | Dec. 22, 1970 |
| [73] | Assignee | Matsushita Electric Industrial Co., Ltd.<br>Osaka, Japan<br>a corporation of Japan |
| [32] | Priority | May 2, 1968 |
| [33] | | Japan |
| [31] | | Nos. 43/29958 and 43/36528 |

[54] CONDENSER SPLIT-PHASE TYPE SINGLE-PHASE INDUCTION MOTOR
3 Claims, 12 Drawing Figs.
[52] U.S. Cl. .................................................. 318/207,
318/270, 318/221, 318/228, 318/230
[51] Int. Cl. ...................................................... H02p 1/42
[50] Field of Search .......................................... 318/206,
207, 220, 228, 229, 230, 221, 221.5

[56] References Cited
UNITED STATES PATENTS

| | | | |
|---|---|---|---|
| 1,934,060 | 11/1933 | Hanning ........................ | 318/228X |
| 2,120,321 | 6/1938 | Bargdill ......................... | 318/228X |
| 2,406,193 | 8/1946 | Carson .......................... | 318/206X |
| 2,794,142 | 5/1957 | Steele ............................ | 318/228X |

FOREIGN PATENTS

| | | | |
|---|---|---|---|
| 415,853 | 9/1934 | Great Britain ................ | 318/221 |

Primary Examiner—Oris L. Rader
Assistant Examiner—Gene Z. Rubinson
Attorney—Stevens, Davis, Miller & Mosher ABSTRACT: A condenser split-phase-type single-phase induction motor for use with ventilating fans, electric fans, washing machines, room coolers etc., wherein the phases of currents flowing through the windings of the motor are changed by changing the impedance values of impedance elements connected with the motor windings, whereby the rotation of the motor can be reversed and the speed thereof can be varied from zero to the maximum value.

INVENTOR
Koichi Yoshimura
BY Stevens, Davis, Miller & Mosher
ATTORNEYS

INVENTOR
Koichi Yoshimura

BY Stevens, Davis, Miller & Mosher
ATTORNEYS 3,549,969

CONDENSER SPLIT-PHASE TYPE SINGLE-PHASE INDUCTION MOTOR

BACKGROUND OF THE INVENTION

This invention relates to a condenser split-phase type single-phase induction motor.

In a single-phase induction motor for use with an electric fan, a room cooler or the like, it is required that the speed thereof be able to be changed so as to switch its output from high to low and vice versa. Further, in a single-phase induction motor for a ventilating fan performing air-intake and exhaust operations, a reversible-type electric washing machine or the like, it is necessary that the rotation thereof can be switched from forward to reverse and vice versa, and in addition it is in some cases desired that the speed be variable.

In the conventional single-phase induction motors for the foregoing applications, for the purpose of changing the speed, use has been made of either the method of changing the impedance of an impedance element connected in series with the motor winding (so-called voltage-controlling method), or the method of changing the conduction angle of a silicon-controlled rectifier (S.C.R.) connected in series with the motor winding. However, with the former method or voltage-controlling method, a drawback occurs namely that the starting torque is reduced in the case of low-speed rotation, while with the latter method, there occur such drawbacks as that not only an expensive silicon-controlled rectifier but also an ignition circuit and a temperature-compensating circuit for the rectifier are required, which leads to complication in the circuit. Further, in such conventional single-phase induction motors, it is the usual practice to switch the connection of a split-phase condenser with respect to the motor winding by means of a changeover switch to thereby change the rotation from forward to reverse and vice versa. With such an arrangement, however, the motor circuitry becomes very different between before and after the switching, which results in electrically adverse effects.

SUMMARY OF THE INVENTION

The present invention intends to overcome the various foregoing difficulties encountered in the conventional single-phase induction motors. In accordance with the novel feature of the present invention, one end of each of two motor field windings arranged with spatial phase difference is connected with one terminal of an AC power source, a condenser is connected between the other ends of the field windings, an impedance element is connected across the condenser, the branch point or tap of the impedance element is coupled to the other terminal of the AC power source, the impedance values in the portions of the impedance element between the tap and the opposite terminals being variable, and the phase relationship between the currents flowing through the two field windings is changed by changing said impedance values to thereby change the speed and direction of the rotation.

It is an object of the present invention to provide a condenser split-phase-type single-phase induction motor which is so designed that the frequency and direction of rotation can be easily controlled without resorting to a complicated and expensive circuit arrangement and causing the starting torque to be decreased.

Another object of this invention is to provide a condenser split-phase-type single-phase induction motor so designed that the direction of rotation can be smoothly changed and the speed can be changed from maximum to zero and vice versa without steps during both the forward and reverse rotation.

Still another object of this invention is to provide a condenser split-phase-type single-phase induction motor which is adapted to be completely stopped from rotating under such a condition that the speed thereof should be zero by cutting off the power source to prevent wasteful power consumption, in view of the fact that in practice it is not the usual case that such a motor is to be rotated at a speed in the vicinity of zero.

A further object of this invention is to provide an improved impedance element which can be used conveniently for the intended application.

Other objects, features and advantages of this invention will become apparent from the following description taken in conjunction with the accompanying drawings.

BRIEF DESCRIPTION OF THE DRAWINGS

FIG. 1b shows the characteristic curve of the motor shown in FIG. 1a;

FIG. 4b is the characteristic curve of the motor shown in FIG. 4a;

FIG. 5b shows the characteristic curve of the motor shown in FIG. 5a;

FIG. 6b shows the characteristic curve of the motor shown in FIG. 6a; and

DESCRIPTION OF THE PREFERRED EMBODIMENTS

The present invention will now be described in detail with reference to the drawings.

Figure 1A:
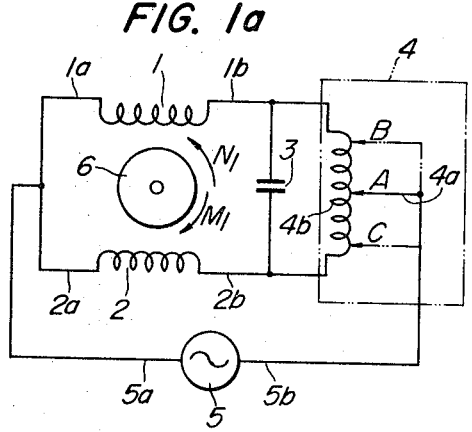
FIG. 1a is a circuit diagram showing the condenser split-phase-type single-phase induction motor according to an embodiment of the present invention.

Referring first to FIG. 1a, the reference numerals 1 and 2 represent field windings which are arranged with a spatial phase difference, one end $1_a$, $2_a$ of each of the field windings 1 and 2 being connected with one terminal $5_a$ of an AC power source 5. A condenser 3 is connected across the opposite ends $1_b$ and $2_b$ of the field windings 1 and 2, and an impedance element $4_b$ is connected across the condenser 3. Tap $4_a$ of the impedance element $4_b$ is coupled to the other terminal $5_b$ of the AC power source 5. A variable impedance element 4 includes said element $4_b$ and said tap $4_a$. The reference numeral 6 denotes a cage rotor.

The position of the tap $4_a$ of the impedance element $4_b$ can be changed as indicated at A, B and C in FIG. 1. In case the tap $4_a$ of the impedance element $4_b$ is located at the position A, currents flowing through the field windings 1 and 2 are in phase with each other so that the rotor 6 will not rotate. In case the tap $4_a$ assumes the position B, the current flowing through the field winding 2 leads that flowing through the field winding 1 so that the rotor 6 rotates at full speed clockwise as indicated by one arrow $M_1$. This is the result of the fact that the condenser 3 is connected in series with the field winding 2. If the tap $4_a$ is moved to the position C as indicated by the one-dot chain line, then the current flowing through the field winding 1 leads that flowing through the field winding 2 so that the rotor 6 rotates at full speed counterclockwise as indicated by the other arrow $N_1$.

Figure 1B:
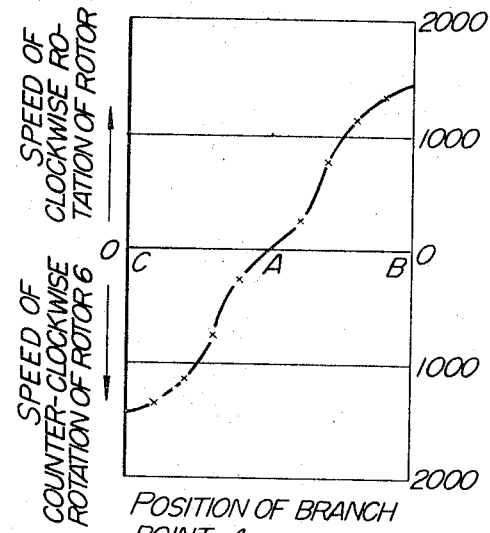

A graphical plot of these characteristics is shown in FIG. 1b. With the tap $4_a$ displaced from (C) to (A) and then to (B), it is possible to achieve counterclockwise full speed rotation, zero speed rotation, and then clockwise full speed rotation. The impedance element $4_b$ may be constituted by whichever of a reactor, resistor, capacitor, etc.

Thus, with the condenser split-phase-type single-phase induction motor illustrated in FIG. 1a, it is possible not only to smoothly change the direction of rotation but also to continuously change the speed from zero to the maximum in the manner of so-called nonstepped speed change without imparting any adverse influence to the rotor, by displacing the tap $4_a$ of the impedance element $4_b$.

Figure 2:
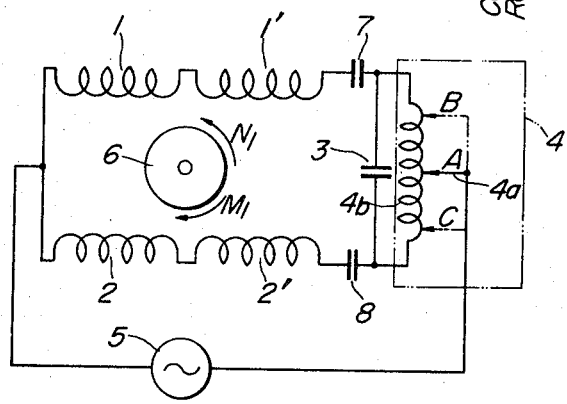
FIGS. 2 and 3 are circuit diagrams showing the condenser split-phase-type single-phase induction motors according to second and third embodiments of the present invention, respectively.
Figure 3:
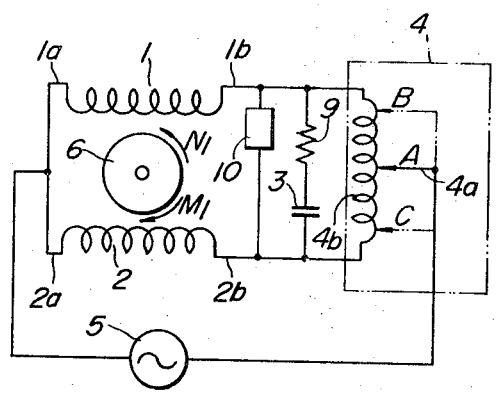

FIGS. 2 and 3 are circuit diagrams showing condenser split-phase-type single-phase induction motors according to slight modifications of that shown in FIG. 1a, each of them being based on the technical idea of the present invention.

More specifically, the motor shown in FIG. 2 includes two field windings which are divided in a plurality of sections, i.e. field winding sections 1, 1' and 2, 2', respectively. In addition to the condenser 3, condensers 7 and 8 are connected in series with the field winding sections 1, 1' and 2, 2' respectively. The remaining portion of the circuit arrangement of FIG. 2 is similar to FIG. 1a.

The circuit arrangement of FIG. 3 is similar to that of FIG. 1a, except that a resistor 9 is connected in series with the condenser 3, and a circuit element 10 such for example as a diode is connected across the ends $1_b$ and $2_b$ of the field windings 1 and 2.

With the condenser split-phase-type single-phase induction motors shown in FIGS. 2 and 3, it is possible to smoothly change both the direction and the speed of the rotor 6 by displacing the tap $4_a$ of the impedance element $4_b$, as is the case with the motor shown in FIG. 1a.

Figure 4A:
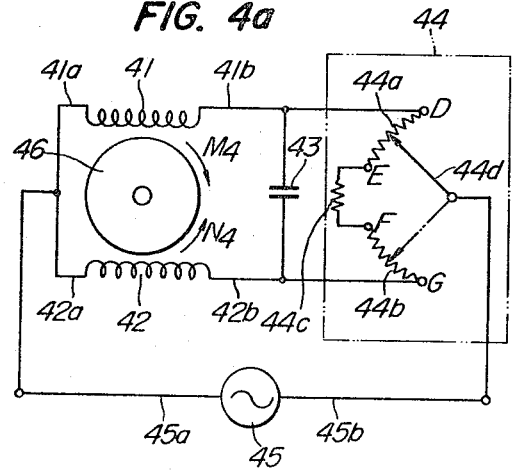
FIG. 4a is a circuit diagram showing the condenser split-phase-type single-phase induction motor according to a fourth embodiment of the present invention.

Referring to FIG. 4a, there is shown the condenser split-phase-type single-phase induction motor, wherein the reference numerals 41 and 42 represent field windings which are arranged with spatial phase difference, one end $41_a$, $42_a$ of each of the field windings 41 and 42 being connected with one terminal $45_a$ of an AC power source 45. A condenser 43 is connected between the opposite ends $41_b$ and $42_b$ of the field windings 41 and 42, and an impedance element 44 is connected across the capacitor 43.

The impedance element 44 may be constituted by whichever of a reactor, resistor, capacitor, semiconductor element, etc. and it comprises two separate impedance element segments $44_a$ and $44_b$, and an impedance element segment $44_c$ connected between a terminal E of the impedance element segment $44_a$ and a terminal F of the impedance element segment $44_b$. Movable tap $44_d$ of the impedance element 44 is coupled to the other terminal $45_b$ of the AC power source 45. Thus, the tap $44_d$ is adjustably connected with any point between the ends D and E of the segment $44_b$, but it is not connected with the segment $44_c$.

In the condenser split-phase single-phase induction motor as shown in FIG. 4a, in case the tap $44_d$ is connected with the impedance element segment $44_a$ (as indicated by the solid line in FIG. 4a), the rotor 46 will be rotated clockwise as indicated by a solid arrow $M_4$. In case the tap $44_d$ is connected with the impedance segment $44_b$ (as indicated by the dotted line in FIG. 4a), the rotor 46 will be rotated counterclockwise as shown by a solid arrow $N_4$. When the tap $44_d$ is engaged with any point between the ends E and F of the impedance element 44, the impedance element is disconnected from the AC power source 45 so that the rotor 46 will be stopped from rotating.

Figure 4B:
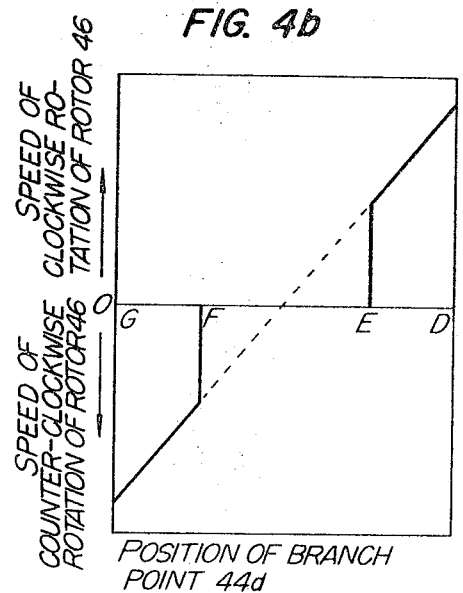

A graphical plot of the foregoing rotational characteristics is shown in FIG. 4b.

Electric motors of this type need not be driven at speed of rotation in the vicinity of zero, and therefore, as described above, the design is made such that the power source is cut off upon arrival of the tap $44_d$ at the central portion of the impedance element 44. This ensures safety for the electric motor and avoids wasteful power consumption.

Figure 5A:
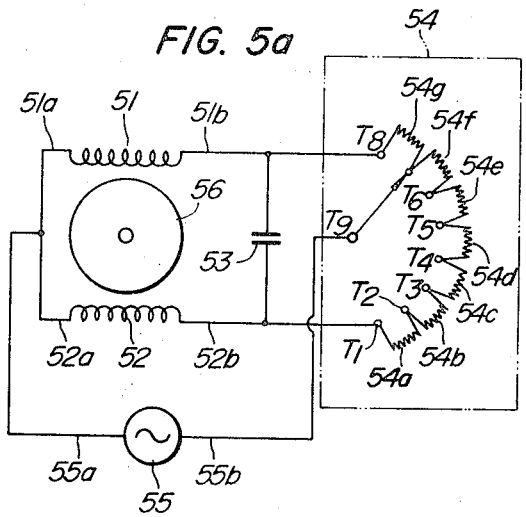
FIG. 5a is a circuit diagram showing the condenser split-phase-type single-phase induction motor according to a fifth embodiment of the present invention.
Figure 5B:
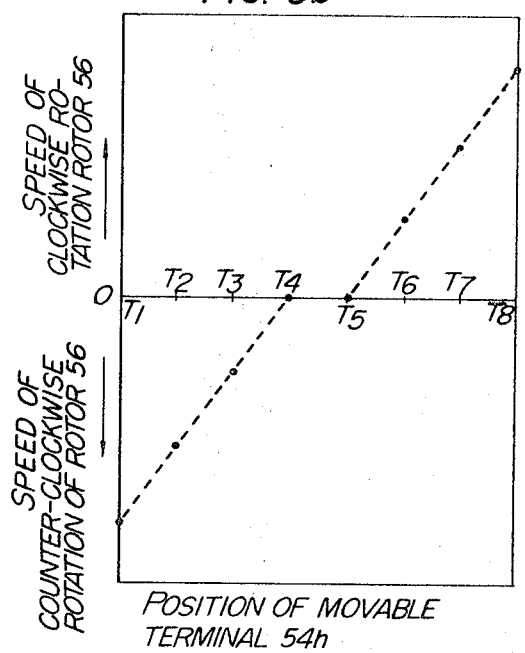
Figure 5C:
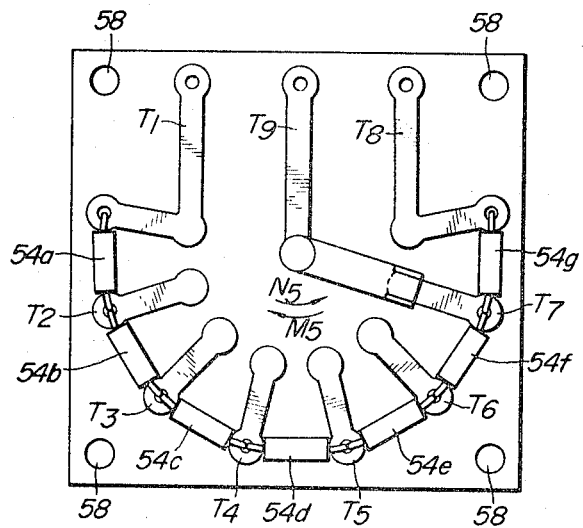
FIG. 5c is a plan view of the impedance element incorporated in the motor according to the present invention.

FIG. 5a shows a fifth embodiment of the present invention, wherein the reference numerals 51 and 52 represent field windings which are arranged with spatial phase difference, one end $51_a$, $52_a$ of each of the field windings 51 and 52 being connected with one terminal $55_a$ of AC power source 55. A condenser 53 is connected between the opposite ends $51_b$ and $52_b$ of the field windings 51 and 52, and an impedance element 54 is connected across the condenser 53. The impedance element 54 is constructed in a notch-type configuration. That is, notches $T_1$, $T_2$, $T_3$, $T_4$, $T_5$, $T_6$, $T_7$, $T_8$, $T_9$ are provided on a print board by means of printing, evaporation, coating, bonding or the like, and fixed impedance elements such for example as solid resistors $54_a$, $54_b$, $54_c$, $54_d$, $54_e$, $54_f$, $54_g$ are connected between the adjacent ones of the notches $T_1$, $T_2$, $T_3$, $T_4$, $T_5$, $T_6$, $T_7$, $T_8$, respectively as in FIG. 5c. Further, a movable terminal $54_h$ which is rotatably carried by the printed board 57 and electrically connected with the notch $T_9$ is adapted to be switchingly brought into electrical contact with the notches $T_1$, $T_2$, $T_3$, $T_4$, $T_5$, $T_6$, $T_7$, $T_8$. The notch $T_9$ is connected with the other terminal $55_b$ of the AC power source 55. The reference numeral 58 represents mounting holes formed in the printed board 57. Thus, by rotating the movable terminal $54_h$ in a direction indicated by the arrow $M_5$ or $N_5$, the notch $T_9$ will be switchingly connected with the notches $T_8$, $T_7$, $T_6$, $T_5$, $T_4$, $T_3$, $T_2$, $T_1$ so that the direction and speed of the rotor 56 are changed as shown in FIG. 5b.

The use of the notch type variable impedance element makes is possible to construct such element in any desired configuration and facilitate the design of products to which the same is applied and the attachment thereof. Thus, the impedance values and dispositions for the fixed impedance elements can be selected so as to be in accordance with the specification that the heat dissipation effect can be increased and the variable impedance element can be miniaturized and produced at low cost. Furthermore, by suitably selecting the number of notches and constructing the movable terminal in split type, it is possible to produce an effect similar to that produced by an integral lumped-type variable impedance element. Still furthermore, the impedance values for the fixed impedance elements between the notches can easily be changed sequentially, so that the speed characteristics of the electric motor can be established optionally.

Figure 6A:
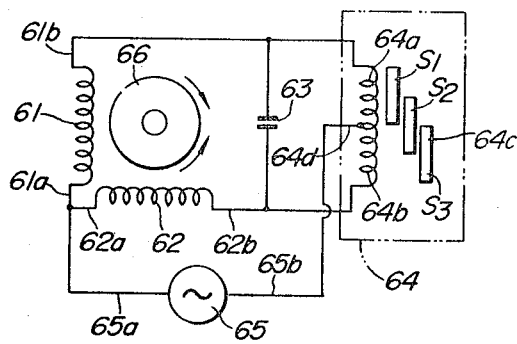
FIG. 6a is a circuit diagram showing the condenser split-phase-type single-phase induction motor according to a sixth embodiment of the present invention.

FIG. 6a shows a sixth embodiment of the present invention, wherein the reference numerals 61 and and 62 represent field windings which are arranged with spatial phase difference, one end $61_a$, $6_a$ of each of the field windings 61 and 62 being connected with one terminal $65_a$ of AC power source 65. A condenser 63 is connected between the other ends $61_b$ and $62_b$ of the field windings 61 and 62. The reference numeral 64 denotes an impedance distributor consisting of coils $64_a$ and $64_b$, and a movable core $64_c$ disposed in the neighborhood of the coils $64_a$ and $64_b$. The coils $64_a$ and $64_b$ are connected across the capacitor 63, and a point $64_d$ which corresponds to the connection point between the coils $64_a$ and $64_b$ is coupled to the other terminal $65_b$ of the AC power source 65.

The impedance 64, though its overall impedance is substantially invariable, is adapted to suitably distribute the impedance values for the coils $64_a$ and $64_b$ through the movement of the movable core $64_c$.

Suppose now that the movable core $64_c$ assumes a position $S_1$ opposed to the coil $64_a$. In such a case, the impedance of the coil $64_a$ increases remarkably, while the impedance of the coil $64_b$ becomes substantially zero, so that, equivalently, the AC power source 65 is connected with the field winding 61 through the capacitor 63 and it is connected directly with field winding 62. Thus, a current $I_1$ flowing through the field winding 61 leads a current $I_2$ flowing through the field winding 62. In case the movable core $64_c$ assumes a position $S_2$ opposed to the point $64_d$, then the impedances of the field windings $64_a$ and $64_b$ become equal, so that the currents $I_1$ and $I_2$ flowing through the field windings 61 and 62 respectively are in phase with each other. In case the movable core $64_c$ assumes a position $S_3$ opposed to the coil $64_b$, then the impedance of the coil $64_b$ becomes remarkably high while that of the coil $64_a$ becomes extremely low, so that, equivalently, the current $I_2$ flowing through the field winding 62 leads the current $I_1$ flowing through the field winding 61.

Figure 6B:
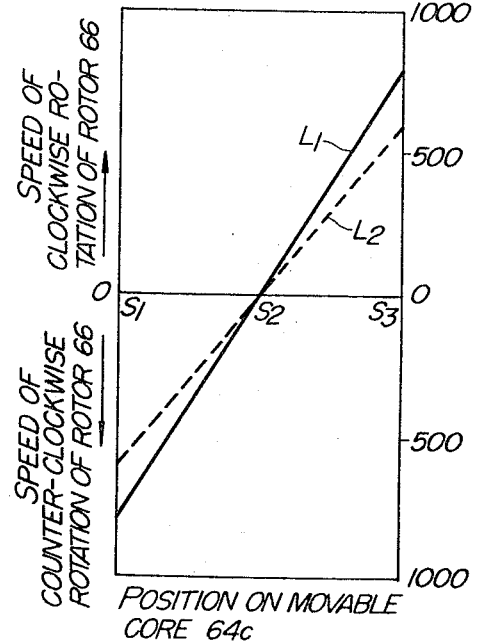

Thus, the relationship between the direction and the speed of the rotor 66 in terms of the position of the movable core $64_c$ is as shown in FIG. 6b. From this, it will be seen that the speed of the rotor 66 is changed linearly with the displacement of the movable core $64_c$. Further, as the overall impedance of the coils $64_a$ and $64_b$ decreases, the maximum speed decreases as shown by the dotted line in FIG. 6b, and the input current tends to increase. Therefore, it is required that the overall impedance of the coils $64_a$ and $64_b$ be relatively high.

Experimental results show that in the case where said overall impedance is higher than 1 K$\Omega$, the speed of the rotor becomes substantially equal to the maximum obtainable frequency which can be achieved without using the impedance distributor. Furthermore, it has been found that, though not illustrated in the drawing, the relationship between the position of the movable core $64_c$ and the input current is such that when the movable core $64_c$ is located at the position $S_1$ or $S_3$, the input current becomes maximum and by increasing the overall impedance of the coils $64_a$ and $64_b$, the input current can be reduced to a substantially negligible extent.

In accordance with the present invention, no complicated mechanism and circuits as incorporated in the conventional control devices are required for changing the direction and speed of rotation of the rotor. A further big advantage of the present invention is, among others, that the construction is greatly simplified since no contacts are used, so that the direction and speed of rotation of the rotor can be controlled through a simple one-dimensional operation.

Figure 7:
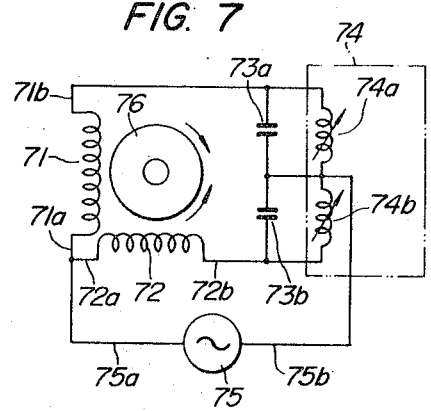
FIG. 7 is a circuit diagram showing the condenser split-phase-type single-phase induction motor according to a seventh embodiment of the present invention.

FIG. 7 shows a seventh embodiment of the present invention, wherein the reference numerals 71 ad and 72 represent field windings which are arranged with spatial phase difference, one end $71_a$, $72_a$ of each of the field windings 71 and 72 being connected with one terminal $75_a$ of AC power source 75. Series condensers $73_a$ and $73_b$ are connected between the other ends $71_b$ and $72_b$ of the field windings 71 and 72, series variable impedance elements $74_a$ and $74_b$ are connected across the series condensers $73_a$ and $73_b$, and the connection point between the condensers $73_a$ and $73_b$ and that between the variable impedance elements $74_a$ and $74_b$ are coupled to the other terminal $75_b$ of the AC power source 75.

In the arrangement of FIG. 7, if the impedance values for the variable impedance elements $74_a$ and $74_b$ are substantially equal, then currents $I_1$ and $I_2$ flowing through the field windings 71 and 72 respectively are substantially in phase with each other, so that the rotor will not be rotated in any direction.

However, in case the impedance of the variable impedance element $74_b$ is higher than that of the variable impedance element $74_a$, then the current $I_2$ flowing through the field winding 72 leads the current $I_1$ flowing through the field winding 71, so that the rotor 72 will be rotated clockwise or in the direction indicated by the solid arrow in FIG. 7.

On the contrary in case the impedance of the variable impedance element $74_a$ is higher than that of the variable impedance element $74_b$, then the current $I_2$ flowing through the field winding 72 lags behind the current $I_1$ flowing through the field winding 71, so that the rotor 76 will be rotated counterclockwise or in the direction as indicated by the arrow in FIG. 7.

Thus, by changing the impedance values for the variable impedance elements $74_a$ and $74_b$, it is possible to reverse the direction of rotation of the rotor 76.

During the clockwise rotation of the rotor 76, if the impedance of the variable impedance element $74_a$ is increased and that of the element $74_b$ is decreased, the speed of rotation of the rotor 76 is gradually lowered, and if the impedance of the variable impedance element $74_b$ is greatly decreased while the impedance of the element $74_a$ is correspondingly increased, then the rotor 76 is reversed to counterclockwise rotation.

Thus, by suitably adjusting the impedance values of the variable impedance elements $74_a$ and $74_b$, it is possible to freely change the direction and frequency of the rotor 76. However, in case the maximum impedance values for the variable impedance elements $74_a$ and $74_b$ are too low, then the rotation controlling effect will be reduced so that difficulty will be encountered in increasing the speed of the counterclockwise rotation. In practice, care should be taken in that respect.

By interlocking the variable impedance elements $74_a$ and $74_b$ in such a manner that their impedance values are changed in opposite direction (if impedance of one of the variable impedance elements is increased, the impedance of the other element is decreased), the controlling of the direction and the speed of rotation of the rotor 76 can be further facilitated alternately, at least two transformers (not shown) may be employed instead of said impedance elements, one end of the primary windings of the transformers being connected in common with the common connection point of condensers $73_a$ and $73_b$ and with terminal $75_b$ of the AC power source, the other ends of the primary windings being respectively connected with ends $71_b$ and $72_b$ of field windings 71 and 72, respectively; otherwise in addition to the foregoing two transformers, instead of condensers $73_a$ and $73_b$ one condenser may be connected between ends $71_b$ and $72_b$ of said field windings, which ends are also respectively connected with one end of each of the primary windings, the other ends of the primary windings being commonly connected with each other and with terminal $75_b$ of the power source; thus the secondary windings of the transformers are respectively coupled across proper variable impedance elements (such as, variable resisters, etc). The direction and the speed of the rotor may be changed by changing values of said variable impedance elements.

I claim:
1. A condenser split-phase fan-motor-type variable speed and reversible induction motor device comprising a rotor, a pair of field windings arranged with a spatial phase difference which have a common terminal connected with one terminal of an AC power source, a condenser connected between the other ends of said field windings, and a contactless variable reactor element comprised of an inductance element provided with a movable iron core in the vicinity thereof which element is connected across said condenser and has an intermediate tap connected to a second terminal of said AC power source.

2. A condenser split-phase fan-motor-type of a variable speed and reversible induction motor device comprising a rotor, a pair of field windings arranged with spatial phase difference which have a common terminal connected with one terminal of an AC power source, two condensers connected in series with the other ends of said field windings, two transformers having primary and secondary coils, the respective one ends of whose primary coils are connected across said condensers, the other ends of said primary coils being connected in common with the common terminal of said condensers and a second terminal of said AC power source, and variable impedance elements each connected across the secondary coil of said transformers.

3. A condenser split-phase fan-motor-type variable speed and reversible induction motor device comprising a rotor, a pair of field windings arranged with spatial phase difference which have a common terminal connected with one terminal of an AC power source, a condenser connected between the other ends of said field windings, two transformers respective one ends of whose primary coils are connected across said condenser and the other ends of said coils are connected in common with a second terminal of said AC power source, and variable impedance elements each coupled across the secondary coil of said transformers.